Patented June 1, 1926.

1,586,764

UNITED STATES PATENT OFFICE.

HAROLD JOSEPH WHEATON, OF LOWER WALTON, NEAR WARRINGTON, ENGLAND, ASSIGNOR, BY MESNE ASSIGNMENTS, TO AMERICAN DOUCIL COMPANY, OF PHILADELPHIA, PENNSYLVANIA, A CORPORATION OF PENNSYLVANIA.

BASE-EXCHANGE SILICATE AND PROCESS OF MAKING IT.

No Drawing. Application filed March 28, 1922, Serial No. 547,591, and in Great Britain January 25, 1922.

The object of this invention is to produce a very efficient base-exchanging compound, the said compound being prepared by mixing a solution of sodium silicate and a solution of sodium aluminate under such conditions and in such proportions as hereinafter explained, that a gel of homogeneous structure is produced from the whole mass of the said mixed solutions, as distinguished from the formation of a precipitate which separates and leaves a clear liquid which does not set into a gel. This gel is sufficiently stiff or solid to be inherently capable of maintaining its physical shape and during subsequent treatment the structure is retained or preserved and carried over into the finished product.

The said gel, so obtained and structurally maintained when dried gently and sufficiently to become hard, and afterwards washed, constitutes a product which is insoluble in water, highly porous and in the condition of irregular granules of convenient size possessing great absorptive power in the dry state and being of marked efficiency as a base-exchanging compound.

The distinguishing feature of this invention is the production of the aforesaid gel of homogeneous structure and the preservation thereof which confers upon the finished product exceptionally efficient qualities of base-exchanging capacity and in this connection it might be said that gelation is generally understood to be the development of a structure of a solid phase within a liquid which may be compared to a honeycomb of extremely minute dimensions having its cells filled with a liquid.

In order to obtain the said gel, it is necessary that the conditions under which the process is carried out shall be such that the produced gel will contain a percentage of alumina, (based on the total solids originally present in the mixture) of not less than six and not more than sixteen per cent.

This result is secured by mixing in the cold (that is not above, say, about 20° centigrade) solutions of sodium aluminate and sodium silicate in proportions so calculated as to yield a gel containing the desired percentage of alumina within the aforesaid limits, it being necessary to effect thorough mixing of the liquid solutions before gelatinization takes place in order to ensure the production of the gel of homogeneous structure. The strength of the solutions of sodium aluminate and sodium silicate will be adjusted according to the particular composition of the final product required, products containing the higher proportions of alumina requiring to be made from solutions of the reagents more dilute than those required for making products containing lower porportions of alumina. If the solutions be too concentrated there is danger of the objectionable local formation of gelatinous precipitate before general gelatinization of the liquor occurs.

The degree of dilution of the reagents also depends upon the temperature of the solutions which temperature should be as low as is conveniently possible, and in any case below 20° centigrade, the required dilution increasing with the temperature.

The minimum dilutions necessary for gels of the required alumina content within the aforesaid limits, will readily be found by trial in accordance with the directions hereinafter given.

The sodium aluminate employed may have been prepared by any suitable method, but it is preferable to have present as little excess of soda as possible because excess of soda tends to cause premature formation, and separation, of a non-homogeneous gelatinous precipitate before thorough mixing of the solutions has been achieved.

The sodium silicate employed may contain sodium oxide and silica in varying ratios in which it is contained in sodium silicate as commercially available, but to avoid excess of soda it is preferred to use the "neutral" silicate in which there is less sodium oxide present per unit of silica.

The quantities of oxides of sodium silicon and aluminium, employed are such that the quantity of alumina present is that necessary to ensure the aforesaid percentage of between six and sixteen per cent of alumina, the percentage being based upon the total solids originally present in the mixture.

The following are examples of how this invention may be performed, but it is not limited to the precise details of these examples.

*Example 1.*

From four to six parts by weight of a solution of sodium silicate of about 30° Twaddell, and one part by weight of a solution of sodium aluminate of about 25° Twaddell are thoroughly mixed in the cold (that is not above say about 20° centigrade). On standing for a short time the whole mixture sets into a homogeneous stiff gel which is then dried until it become sufficiently hard, and then is washed and a base-exchanging compound, having the aforesaid properties, is obtained.

The gels produced in accordance with this example are of relatively low alumina content, say from six, to nine, per cent of the total solids originally present in the mixture. For the preparation of gels containing higher percentages of alumina (up to the aforesaid limit of sixteen per cent) the procedure according to the following example is preferable:—

*Example 2.*

Four parts by weight of a solution of sodium silicate of 15° Twaddell are thoroughly mixed in the cold, with one part by weight of a solution of sodium aluminate of 25° Twaddell, the resulting stiff gel being afterwards dried until it is sufficiently hard, and afterwards washed.

The drying of the gel in all these examples, should be effected in a current of warm air until the gel becomes just hard, the drying tending to solidify the liquid phase of the gel by crystallization of the soluble substances present such as sodium metasilicate ($Na_2SiO_3$) formed during the reaction. This practically closes the porous structure which, however, readily becomes available again by subsequent washing in a current of water, the washing acting to remove any uncombined sodium silicate, or free alkali, (or both) together with any soluble substances formed during the reaction such as the sodium metasilicate mentioned. The material then breaks down from lumps into granules and the lixiviated mass is ready for use as a base-exchanging compound.

If the initial drying be continued beyond the aforesaid limits, although the base-exchanging efficiency of the material will not be affected, the average size of the granules will be smaller in accordance with the extent to which the drying operation is carried.

In carrying out the process according to this invention care should be taken to avoid the formation of a flocculent gelatinous precipitate. To this end substantially pure solutions and moderate temperatures should be employed, ordinary or average living temperatures being preferred. Furthermore, overheating during drying should be avoided, a mild warmth being the most desirable.

I do not claim, under this invention, any process in which a precipitate in a liquid is produced, the process of this invention producing a homogeneous stiff gel, into which the whole mass of the mixed liquids, sets, this gel being of uniform consistency in which the whole of the water present is held dispersed and fixed throughout the gel-structure.

I claim—

1. The method of manufacturing a base-exchanging compound which consists in forming a gel from the complete mixture of a solution of sodium silicate of from 15° to 30° Twaddell with a solution of sodium aluminate not exceeding 25° Twaddell, in gently drying the gel, and in washing the dried product.

2. The method of manufacturing a base-exchanging compound which consists in mixing in the cold, a solution of sodium silicate of from 15° to 30° Twaddell with a solution of sodium aluminate not exceeding 25° Twaddell; and in drying the gel thus produced.

3. The method of manufacturing a base-exchanging compound which consists in mixing in the cold, a solution of sodium silicate of from 15° to 30° Twaddell with a solution of sodium aluminate not exceeding 25° Twaddell, in drying the gel thus produced and afterwards washing the dried product.

4. As a new article of manufacture, a base-exchanging compound which has been produced from a gel comprising the whole mass of a mixture of solutions of sodium silicate and sodium aluminate.

5. As a new article of manufacture, a base-exchanging compound which has been produced from a gel comprising the whole mass of a mixture of solutions of sodium silicate and sodium aluminate, which gel contained alumina to the extent of not less than six, and not more than sixteen per cent (based on the total solids originally present in the mixture.)

6. The method of manufacturing a double base-exchanging compound in the wet way which consists in mixing the component cold solutions in completely gelatinizing strengths, in drying the gel so produced, and in washing the dried product.

7. In the manufacture of a base-exchanging compound in the wet way the step which consists in forming a stiff or solid gel from and including the whole mass of a mixture of solutions of sodium silicate and sodium aluminate.

8. A base exchanging compound containing silica, aluminum and exchangeable sodium, characterized by homogeneous gel structure and produced from the product resulting from the complete gelation of the solutions from which it is formed without separation of mother liquor.

9. A double base exchange silicate in which practically all of the soluble substances formed by reaction of the constituent solutions are retained in the gel.

10. A double base exchange material in which the soluble substances formed by reaction of the constituent solutions are retained until after the material has assumed a rigid physical structure.

11. A double base exchange material in which substantially all of the soluble salts formed in the reaction between the ingredients of the material are retained until after the material has assumed a rigid physical structure.

12. A double base exchange material in which substantially all of the soluble substances formed in the reaction between the ingredients of the material are retained until after the material has been dried.

13. A double base exchange material from which the soluble salts formed in the reaction between the ingredients of the material are removed only after the material has assumed its ultimate rigid physical structure.

14. The herein described method of manufacturing a base-exchanging compound which consists in mixing, in the cold, a solution of sodium silicate with a solution of sodium aluminate in such proportions and degrees of concentration as to form a gel embracing substantially all of the constituent elements of the solutions, and then drying the gel until it becomes hard.

15. The herein described method of manufacturing a base-exchanging compound which consists in mixing, in the cold, a solution of sodium silicate with a solution of sodium aluminate in such proportions and degrees of concentration as to form a gel embracing substantially all of the constituent elements of the solutions, then drying the gel until it becomes hard, and afterwards washing the product.

16. The herein described method of manufacturing a base-exchanging compound which includes mixing a solution of sodium silicate with a solution of sodium aluminate to form a stiff or solid gel embracing substantially all of the constituent elements of the mixture.

17. The herein described method of manufacturing a base-exchanging compound which includes mixing a solution of sodium silicate with a solution of sodium aluminate to form a gel embracing substantially all of the constituent elements of the mixture, and then drying the mass.

18. The herein described method of manufacturing a base-exchanging compound which includes mixing a solution of sodium silicate with a solution of sodium aluminate to form a gel embracing substantially all of the constituent elements of the mixture, then drying the mass, and afterwards washing.

19. The method of manufacturing a double base-exchanging compound in the wet way which consists in mixing the component solutions in such proportions and degrees of concentration as to produce a stiff or solid gel embracing substantially all of the constituent elements of the mixture and then removing the soluble substances while still retaining or preserving the gel structure so produced.

20. A base exchanging compound produced by first drying and washing a silicious gel containing sodium and then an amphoteric metal and formed as described to include the complete mass of the mixed solutions.

21. A base exchanging compound produced by first drying and then washing a silicious gel containing an alkali metal and an amphoteric metal and formed as described to include the complete mass of the mixed solutions.

22. A base exchanging compound made in the wet way containing silica, aluminum, and an alkali metal, the latter exchangeable for metals of the alkaline earth group in reversible direction and said product being characterized by homogeneous gel structure determined by forming a stiff or solid gel without residual mother liquor which is then made rigid by drying.

23. As a new article of manufacture, a double base-exchanging compound made in the wet way and characterized by homogeneous gel structure determined by forming a stiff or solid gel in which the whole of the liquid present is fixed throughout the gel structure and from which the soluble substances are subsequently removed while still retaining the gel structure.

In testimony whereof I have signed my name to this specification.

HAROLD JOSEPH WHEATON.

DISCLAIMER 1,586,764.—*Harold Joseph Wheaton*, Lower Walton, near Warrington, England. BASE-EXCHANGE SILICATE AND PROCESS OF MAKING IT. Patent dated June 1, 1926. Disclaimer filed March 11, 1930, by the assignee by mesne assignments, *American Doucil Company*.

Enters this disclaimer to that part of the claims in the said specification which are in the following words, to wit:

"7. In the manufacture of a base-exchanging compound in the wet way the step which consists in forming a stiff or solid gel from and including the whole mass of a mixture of solutions of sodium silicate and sodium aluminate."

[*Official Gazette March 25, 1930.*]